United States Patent
Grziwok et al.

(10) Patent No.: US 9,692,175 B2
(45) Date of Patent: Jun. 27, 2017

(54) SNAP-ON EDGE CONNECTOR SYSTEM

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

( * ) Notice: Subject to any disclaimer, the term of this patent is extended or adjusted under 35 U.S.C. 154(b) by 0 days.

(21) Appl. No.: 15/011,052

(22) Filed: Jan. 29, 2016

(65) Prior Publication Data

US 2016/0226185 A1 Aug. 4, 2016

Related U.S. Application Data

(60) Provisional application No. 62/110,389, filed on Jan. 30, 2015.

(51) Int. Cl.
*H01R 13/627* (2006.01)
*H01R 4/48* (2006.01)
*H01R 13/24* (2006.01)
*H01R 24/28* (2011.01)

(52) U.S. Cl.
CPC ....... *H01R 13/6271* (2013.01); *H01R 4/4863* (2013.01); *H01R 13/2421* (2013.01); *H01R 13/627* (2013.01); *H01R 13/2407* (2013.01); *H01R 24/28* (2013.01)

(58) Field of Classification Search
CPC .................................................. H01R 13/6272
USPC ................... 439/700, 378, 289, 355, 357
See application file for complete search history.

(56) References Cited

U.S. PATENT DOCUMENTS 5,911,599 A * 6/1999 Masuda ............. H01R 13/6592
                                                        439/578
5,993,240 A   11/1999 Schaefer
6,146,210 A * 11/2000 Cha ..................... H01R 13/2421
                                                        439/289

(Continued)

FOREIGN PATENT DOCUMENTS

EP          2317608 A1      5/2011

OTHER PUBLICATIONS

International Application No. PCT/US2016/015618, Notification of Transmittal of the International Search Report and the Written Opinion of the International Searching Authority, mailed Apr. 13, 2016, 16 pages.

*Primary Examiner* — Tulsidas C Patel
*Assistant Examiner* — Marcus Harcum
(74) *Attorney, Agent, or Firm* — Fish & Richardson P.C.

(57) ABSTRACT

An electrical connection system can include a first member including one or more spring pins, located within a rigid frame. After assembling the spring pins into the rigid frame of the first member, the frame can be overmolded creating an electrical connector at the end of a cable. The second member of the system can include one or more contact pads located within a rigid frame. After assembling the contact pads into the rigid frame of the second member, the frame can be overmolded creating an electrical connector at the end of a cable. The rigid frame of the first member can be located within the rigid frame of the second member to align the spring pins with the contact pads. Retention features in he rigid frame of the first member can allow gripping the edge of a device or protective case into which the second member is mounted.

20 Claims, 5 Drawing Sheets

(56) References Cited

U.S. PATENT DOCUMENTS

| | | | | |
|---|---|---|---|---|
| 7,455,552 B1* | 11/2008 | Fang | ................... | H05K 3/284 |
| | | | | 439/606 |
| 7,889,489 B2* | 2/2011 | Richardson | ........... | G06F 1/1626 |
| | | | | 206/305 |
| 7,892,025 B2* | 2/2011 | Daily | ................ | H01R 13/504 |
| | | | | 439/606 |
| 8,262,403 B2* | 9/2012 | Slippy | ................ | H01R 13/5808 |
| | | | | 439/353 |
| 8,360,796 B2* | 1/2013 | Daubigney | ........ | H01R 13/6275 |
| | | | | 439/345 |
| 8,845,363 B2* | 9/2014 | Ardisana, II | ...... | B29C 45/14065 |
| | | | | 439/606 |
| 9,011,179 B2* | 4/2015 | Siahaan | ............... | H01R 13/504 |
| | | | | 439/606 |
| 2004/0002243 A1 | 1/2004 | Mellott | | |
| 2009/0298339 A1* | 12/2009 | Wu | ....................... | H01R 4/023 |
| | | | | 439/607.41 |
| 2011/0076883 A1* | 3/2011 | Jol | ..................... | B29C 45/1671 |
| | | | | 439/521 |
| 2013/0045618 A1 | 2/2013 | Sen | | |
| 2013/0052871 A1* | 2/2013 | Eklind | ................. | H02J 7/0042 |
| | | | | 439/620.21 |
| 2014/0308840 A1* | 10/2014 | Kuo | .................. | H01R 12/7082 |
| | | | | 439/357 |

\* cited by examiner

SECTION B-B

SNAP-ON EDGE CONNECTOR SYSTEM

CROSS-REFERENCE TO RELATED APPLICATIONS

This application claims priority to U.S. application Ser. No. 62/110,389 filed on Jan. 30, 2015, the entire contents of which are incorporated herein by reference.

TECHNICAL FIELD

This disclosure relates to an electrical connector system, for example, for connecting power and data circuits for electronic devices.

BACKGROUND

A convenient, attractive, and functional electrical connection is generally needed and desirable on electronic devices. Such connectors can be used to provide mains power or data connections or both. For handheld devices, it may be desirable for the cable-side portion of such connector systems to retain to the edge of the device or enclosure to which it attaches. For handheld devices, it may be desirable for the device-side portion of such connector systems to be generally flush to the edge of the device, so that they do not collect lint and debris in small crevices, and not include any protuberance which may be uncomfortable in the hand.

SUMMARY

This disclosure relates to an electrical connector system, for example, for connecting power and data circuits for electronic devices. The connector system described herein combines a frame-and-overmold construction with spring-pin and pad contacts. The removable portion of the connection (typically disposed at the end of a cable) includes retention features that allow it to grip the edge of the device into which the mating connector is mounted.

A first member of the system can include one or more swing pins, located within a rigid frame. After assembly of the spring pins into the rigid frame of the first member, the frame can be overmolded to create an electrical connector at the end of a cable. A second member of the system can include one or more contact pads located within a rigid frame. After assembly of the contact pads into the rigid frame of the second member, the frame can be overmolded to create an electrical connector at the end of a cable. The rigid frame of the first member can include features to locate (i.e., position) it relative to features within the rigid frame of the second member so that the spring pins in the first member align with the contact pads of the second member. The rigid frame of the first member can further include one or more retention features which allow it to grip the edge of a device or protective case into which the second member is mounted.

In an exemplary implementation, an electrical connection system may include a first member having a first rigid frame into which one or more spring pins are assembled and subsequently overmolded. The first rigid frame has first locating features that locate to a second rigid frame of a second member, and first mating features that extend over the front and rear surfaces of and grip the edge of, a device housing. The electrical connection system further may include a second member having a second rigid frame into which one or more contact pads are assembled and subsequently overmolded. The second rigid frame has second locating features that locate to the first rigid frame of the first member. The overmold of the second member includes features, such as screw mounts, which allow the second member to be fixedly mounted within the device housing. The electrical connection system further may have one or more retention features, such as a groove or recess, incorporated into the device housing and configured to be gripped by the first rigid frame of the first member, whereby the first member is retained to an edge of the device housing.

The device housing may be the external housing of an electronic device, or it may be a protective or secure housing for a tablet computer or mobile phone.

BRIEF DESCRIPTION OF THE DRAWINGS

Like reference numbers and designations in the various drawings indicate like elements.

DETAILED DESCRIPTION

This disclosure relates to an electrical connector system, for example, for connecting power and data circuits for electronic devices. The connector system described herein combines a frame-and-overmold construction with spring-pin and pad contacts. The frame portion of the connectors can be injection molded from hard plastic, such as ABS. Into this frame, electrical contacts, such as spring pins (e.g., for the external connector) or flat contact pads (e.g., for the internal connector) can be disposed, with highly repeatable spacing and positioning. That is, because the frame is injection-molded, the spacing of the holes for the pins is easily repeatable (made the same every time) because it is controlled by the injection molding tool. This repeatability reduces the positioning error of pins relative to the alignment features (which are in the same tool) and, in turn, from one side of the mated connection to the other.

To assemble the connector, wires (which can be gathered and sheathed into a cable) are electrically connected (by soldering or crimping) to the electrical contacts, which are then inserted into a rigid frame. This assembly is then overmolded with an elastomeric overmolding compound, such as PVC. Both the internal (fixed) and external (removable) members of the connection system are constructed in this manner. In addition to channels for inserting the electrical contacts, the molded frames can incorporate features by which they align to each other, guaranteeing easy and proper alignment of the electrical contacts.

The removable (i.e., external) portion of the connector assembly (typically disposed at the end of a cable) includes external-side retention features that allow it to grip the edge of the device into which the mating connector is mounted. While the fixed-side (i.e., internal) portion of the connector assembly has alignment features that are incorporated into the frame portion of the internal connector, the retention features on the fixed-side portion are not part of the internal connector but rather are on the housing of the device itself. Thus, the frame of the external connector grips the edge of the device housing, rather than the internal (fixed) connector, as is conventional. This connector architecture allows for a better user experience when attaching and removing the connector, as the action is one of "clipping on" rather than "plugging in" and "peeling off" rather than "unplugging". "Clipping on" and "peeling off" involve less manual dexterity and careful alignment than plugging operations, and can thus be preferred by some customers who may have less manual dexterity or who wish to complete the operation faster.

Figure 1:
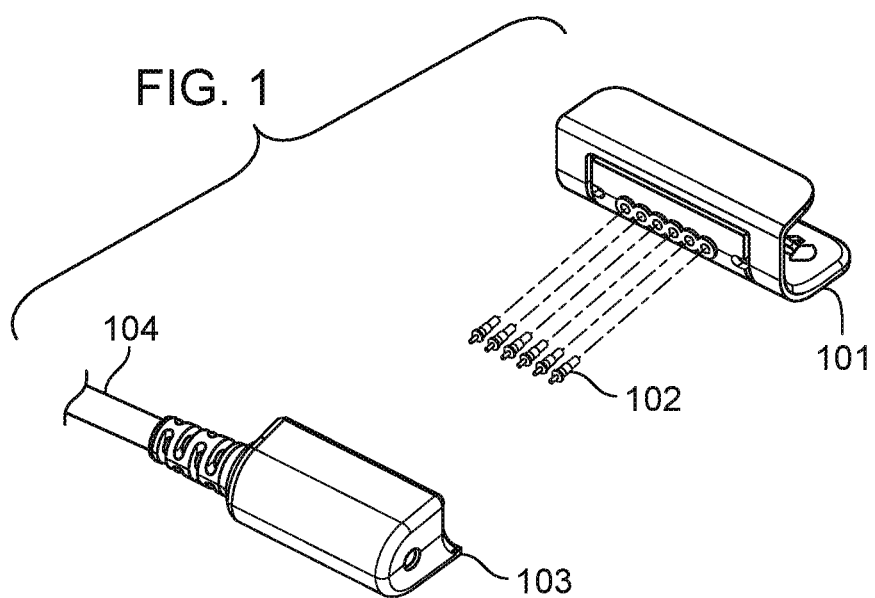
FIG. 1 illustrates an example first member of the connector system in exploded view.

FIG. 1 illustrates the construction of an example external connector 100, e.g., such as would be implemented on an end of a data and/or power cable. The example external connector 100 incorporates an external frame 101 which holds a series of spring pins 102. Electrical conductors, for example wires, from cable 104 are soldered to each of the spring pins 102. Alternately, one or more of spring pins 102 may be installed without an attached conductor. The frame assembly, which includes the external frame with pins and electrically connected cable 104, is then overmolded 103 with elastomeric or plastic overmolding material. This material, typical in connectors, protects and insulates the wires and soldered connections from the environment.

Figure 2:
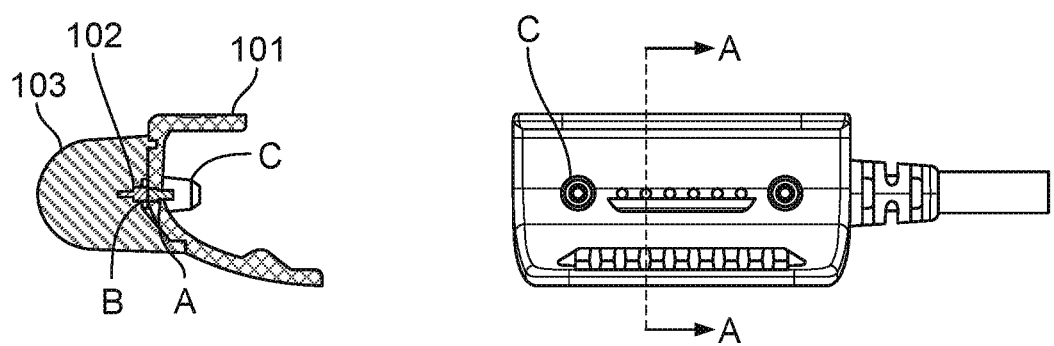
FIG. 2 illustrates a cross-sectional view of an example first member of the connector system.

FIG. 2 illustrates a cross section of the example external connector 100 shown in FIG. 1. The frame 101 incorporates several functional elements which are indicated in the figure. The spring pins 102 are located or positioned by holes A and shoulder B. This allows the spacing and height of the pins to be accurately set and independent of the overmolding process. Frame 101 also incorporates two locating features C (e.g., posts) which insert into mating features (e.g., sockets) in frame 201 of the counterpart internal connector. These locating features allow the pins and pads on connector 100 and connector 200 to be relatively positioned and mated easily and accurately. The retention feature D (also referred to as the "snap") located on frame 101 can be implemented as a ridge or bump that extends across all or a portion of the frame 101, and is designed to snap into a mating feature (e.g., groove) on the device enclosure 300. The snap feature D retains the removable, external connector 100 to the device body 300, and ensures that the spring pins 102 are pressed against the mating contact pad 202.

As shown in cross-section A-A, the frame 101 roughly approximates the letter "c" and has a flat top portion joined at a right angle to an arcuate bottom portion having a ridge, or snap, at a distal end. The bottom portion can also be flat instead of arcuate. Engagement of the snap feature with a recess in the surface of the device housing thus acts to clamp the mated connection together.

Figure 3:
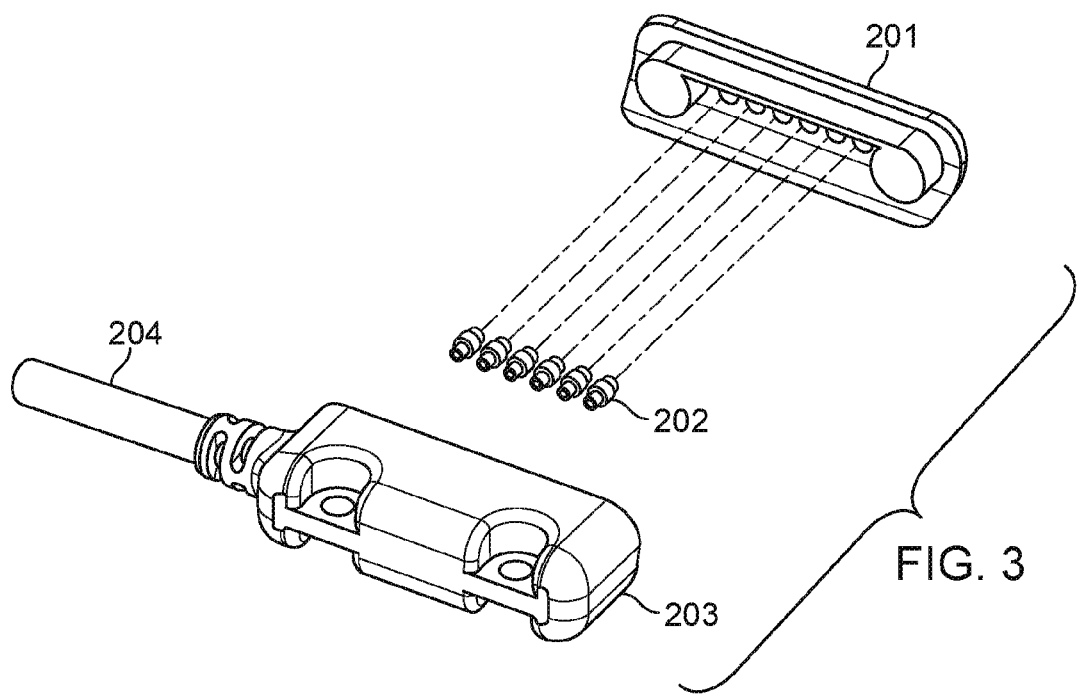
FIG. 3 illustrates an example second member of the connector system in exploded view.

FIG. 3 illustrates the construction of an example internal connector 200, such as would be implemented into a device housing or even the device itself. The internal connector 200 incorporates a frame member 201 which holds a series of contacts 202. Electrical conductors, for example wires, from cable 204 are soldered to each of the contacts 202. Alternately, one or more of contacts 202 may be installed without an attached conductor. The frame assembly, which includes the frame member 201 with contacts 202 and electrically connected cable 204, is then overmolded 203 with elastomeric or plastic overmolding material. This material, typical in connectors, protects and insulates the wires and soldered connections from the environment.

Figure 4:
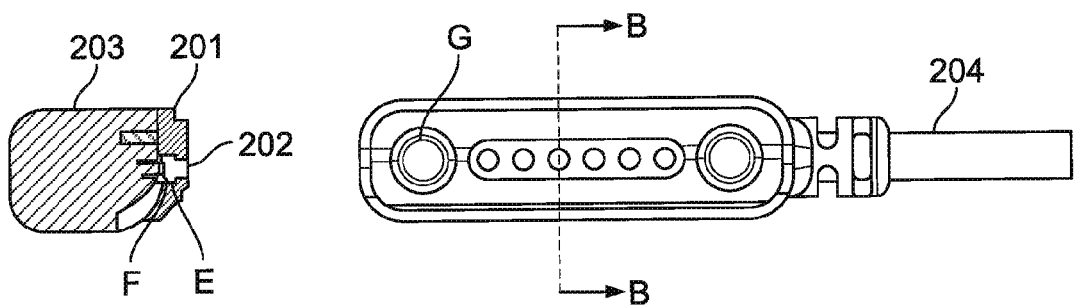
FIG. 4 illustrates a cross-sectional view of an example second member of the connector system.

FIG. 4 illustrates a cross section of the example internal connector 200. Internal frame 201 incorporates functional elements which are indicated in the figure. The contacts 202 are located by holes E and shoulder F. This allows the spacing and height of the contacts 202 to be accurately set, independent of the overmolding process. Internal frame 201 also incorporates two locating features G in the form of sockets, which receive mating features B (posts) which protrudes from external frame 101. These features allow the pins and pads on connector 100 and connector 200 to be relatively positioned and mated easily and accurately.

Figure 5:
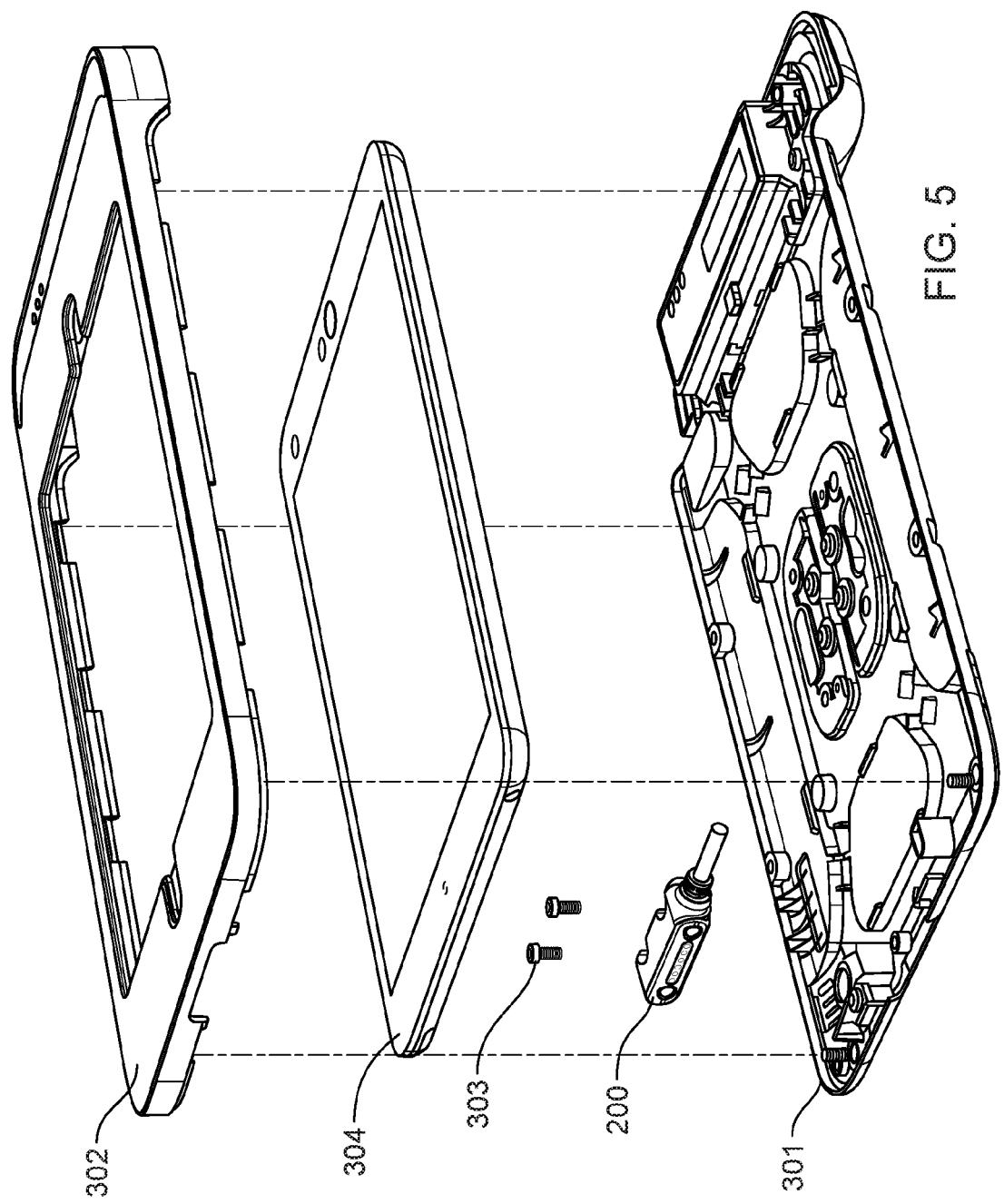
FIG. 5 illustrates the assembly into a device enclosure of an example second member of the connector system.

FIG. 5 illustrates an example integration of an internal connector assembly 200 into a device enclosure 300, comprised of a bottom portion 301 and a top portion 302. The device enclosure 300 may be the housing of an electronic device or may be a case that houses an independent electronic device, such as a tablet 304. Internal connector assembly 200 is designed to mount to bosses in the enclosure with screws 303. The internal connector assembly 200 may alternately be mounted with other means to the enclosure, such as with a snap fit, press fit, or retainer clip. The internal connector assembly 200 may be cabled, as shown, or may be mounted directly to a printed circuit board.

Figure 6:
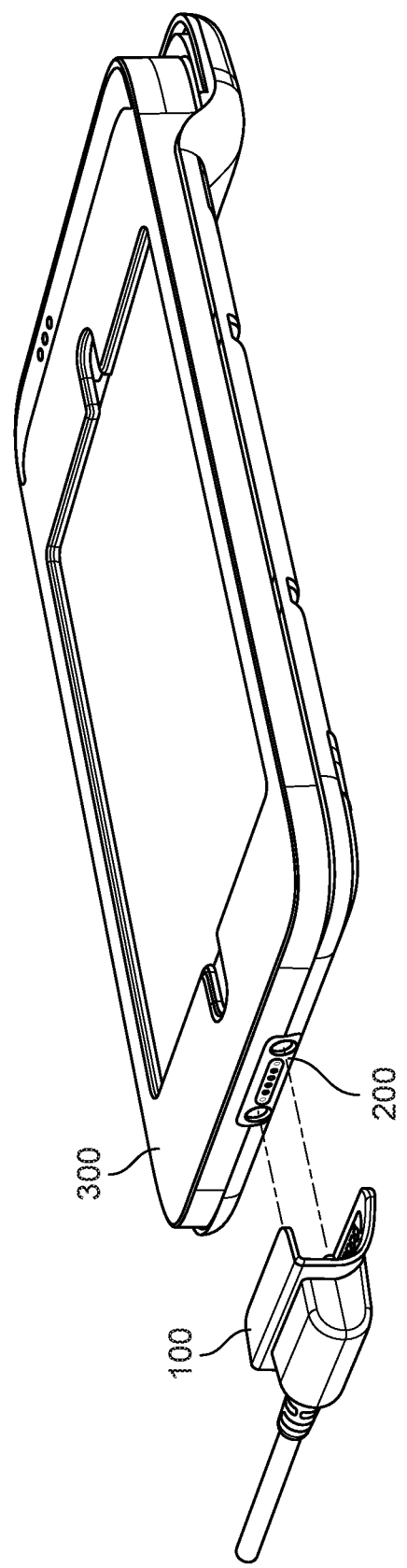
FIG. 6 illustrates the attachment of an example first member onto an example device enclosure.

FIG. 6 illustrates an example external connector 100 mating to internal connector 200, which is embedded within an example device 300. When mated, the spring pins 102 located within external frame 101 mate with contacts 202 located within internal frame 201. Additionally, the external frame 101 on external connector 100 grips and retains the connector to the edge of the device housing 300. Retention of the external connector on the device housing is achieved in various ways, e.g., through the use of a hard, rigid plastic material for the external frame 101, which has sufficient flexibility such that the external frame 101 is able to snap around the edge of the device and into a mating groove. The "C" shape of the frame facilitates this because the upper portion reacts the force of spreading the external frame as is passes over the edge of the device. When engaged, the stiffness of the external frame retains the snap feature into its mated groove, retaining the frame to the edge of the device housing. The retention of the frame to the edge of the device causes the mated electrical connections to remain mated until the connection is intentionally separated by "peeling away" the external connector from the device housing.

Figure 7:
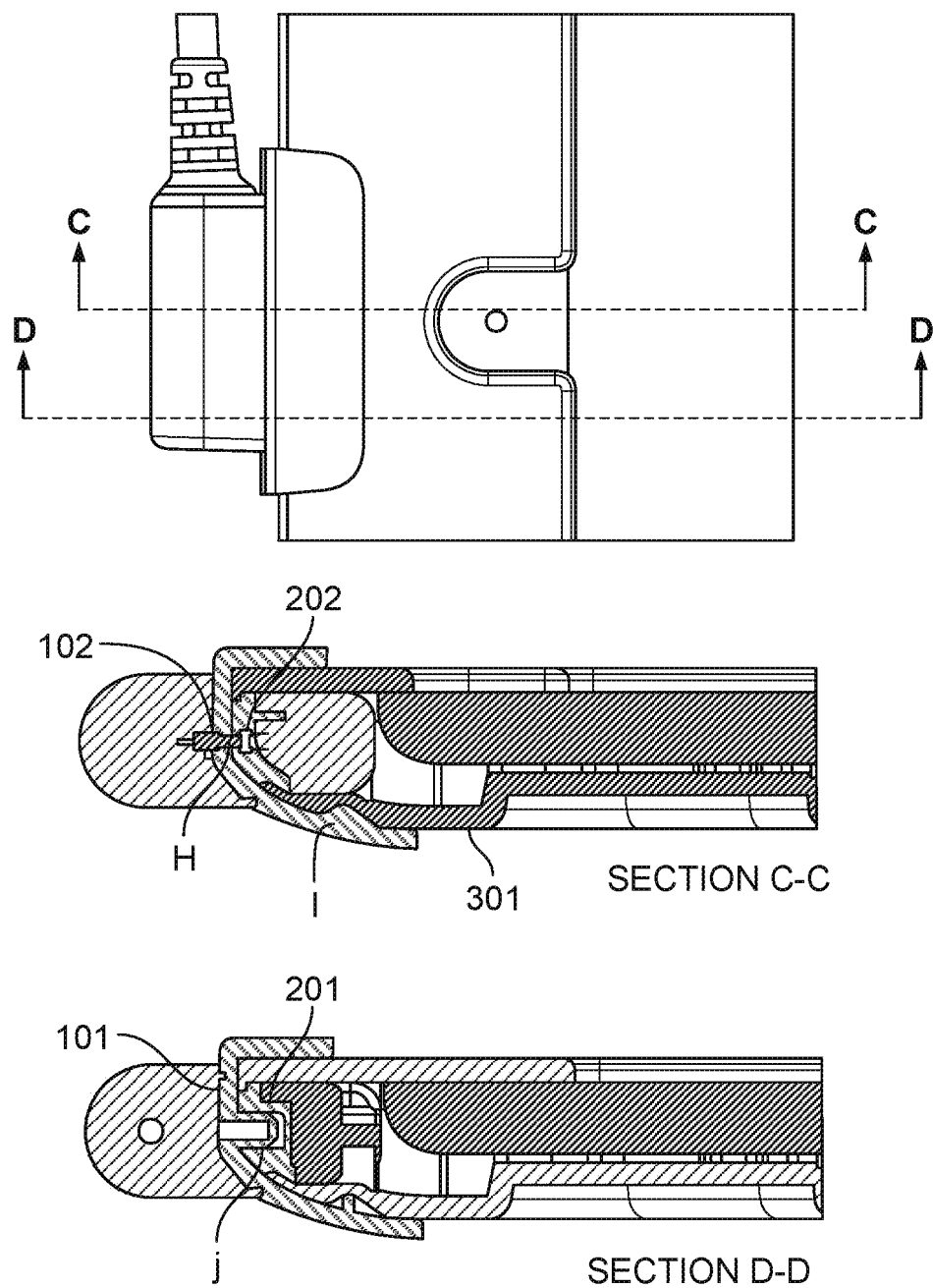
FIG. 7 illustrates two cross-sectional views through a mated connector system, showing the electrical connection and mechanical alignment and retention features.

FIG. 7 illustrates two section views of an example external connector 100 mated to internal connector 200, which is embedded within an example device housing 300. When the connector is mated, the spring pins 102 located within external frame 101 mate with contacts 202 located within internal frame 201 at location H. When the connector is mated, the retention feature on external frame 101 (e.g., ridge or snap) snaps into a matching groove in device housing 301 at location I. When the connector assembly is mated, location features on external frame 101 (e.g., posts) engage with matching location features in internal frame 201 (e.g., sockets) at location J.

A number of implementations have been described. Nevertheless, it will be understood that various modifications can be made without departing from the spirit and scope of the invention.

What is claimed is:
1. An electrical connection system comprising:
  a first member comprising:
    a first rigid frame,
    one or more spring pins assembled and subsequently overmolded into the first rigid frame, first locating features included in the first rigid frame, the first rigid frame and the first locating features formed as a single piece, and first mating features that extend over a front surface and a rear surface of, and grip an edge of, a device housing;

a second member comprising:
a second rigid frame into which the first locating features of the first member locate,
one or more contact pads assembled and subsequently overmolded into the second rigid frame,
second locating features included in the second rigid frame, wherein an overmold of the second member includes features which allow the second member to be fixedly mounted within the device housing; and
one or more retention features incorporated into the device housing and configured to be gripped by the first rigid frame of the first member, whereby the first member is retained to an edge of the device housing.

2. The electrical connection system of claim 1, wherein the device housing is the external housing of an electronic device.

3. The electrical connection system of claim 1, wherein the device housing is a protective or secure housing for a tablet computer or mobile phone.

4. The electrical connection system of claim 1, wherein the features which allow the second member to be fixedly mounted within the device housing comprise screw mounts.

5. The electrical connection system of claim 1, wherein the one or more retention features comprise a groove or a recess.

6. The electrical connection system of claim 1, wherein the first mating features that extends over the front surface and the rear surface comprise a projection configured to mate with one of the one or more retention features incorporated into the device housing.

7. The electrical connection system of claim 6, wherein the projection extends across a portion of the first member.

8. The electrical connection system of claim 1, wherein the first member comprises:
a flat top portion configured to extend over the front surface of the device housing; and
a bottom portion configured to extend over the rear surface of the device housing, the flat top portion jointed at a right angle to the bottom portion.

9. The electrical connection system of claim 8, wherein the bottom portion is arcuate.

10. The electrical connection system of claim 8, wherein the bottom portion comprises a snap feature at a distal end of the bottom portion, the snap feature configured to engage a recess in the rear surface of the device housing.

11. The electrical connection system of claim 1, wherein the first mating features are non-articulating relative to the first rigid frame.

12. An electrical connection system comprising:
a first member configured to attach to an outer surface of a device housing, the first member comprising:
a first rigid frame,
one or more spring pins assembled and overmolded into the first rigid frame,
a plurality of first locating features included in the first rigid frame, and
a plurality of first mating features that extend over a front surface and a rear surface of, and grip an edge of, a device housing, the first rigid frame and the plurality of first mating features formed as a single piece; and
a second member configured to attach to an inner surface of the device housing and to the first member, the second member comprising:
a second rigid frame into which the first locating features of the first member locate,
one or more contact pads assembled and subsequently overmolded into the second rigid frame,
a plurality of second locating features included in the second rigid frame.

13. The electrical connection system of claim 12, further comprising one or more retention features incorporated into the device housing and configured to be gripped by the first rigid frame of the first member, whereby the first member is retained to an edge of the device housing.

14. The electrical connection system of claim 13, wherein the first mating features that extends over the front surface and the rear surface comprise a projection configured to mate with one of the one or more retention features incorporated into the device housing.

15. The electrical connection system of claim 14, wherein the projection extends across a portion of the first member.

16. The electrical connection system of claim 12, wherein an overmold of the second member includes features which allow the second member to be fixedly mounted within the device housing.

17. The electrical connection system of claim 12, wherein the first member comprises:
a flat top portion configured to extend over the front surface of the device housing; and
a bottom portion configured to extend over the rear surface of the device housing, the flat top portion jointed at a right angle to the bottom portion.

18. The electrical connection system of claim 17, wherein the bottom portion is arcuate.

19. The electrical connection system of claim 17, wherein the bottom portion comprises a snap feature at a distal end of the bottom portion, the snap feature configured to engage a recess in the rear surface of the device housing.

20. The electrical connection system of claim 12, wherein the plurality of first mating features are non-articulating relative to the first rigid frame.

* * * * *